(12) United States Patent
Scheich

(10) Patent No.: US 12,061,411 B2
(45) Date of Patent: Aug. 13, 2024

(54) VEHICLE PHOTOGRAPHIC SYSTEM FOR IDENTIFICATION OF SURFACE IMPERFECTIONS

(71) Applicant: Carvana, LLC, Tempe, AZ (US)

(72) Inventor: Davo Scheich, Troy, MI (US)

(73) Assignee: Carvana, LLC

(*) Notice: Subject to any disclaimer, the term of this patent is extended or adjusted under 35 U.S.C. 154(b) by 221 days.

(21) Appl. No.: 17/616,753

(22) PCT Filed: Jun. 8, 2020

(86) PCT No.: PCT/US2020/036573
§ 371 (c)(1),
(2) Date: Dec. 6, 2021

(87) PCT Pub. No.: WO2020/247906
PCT Pub. Date: Dec. 10, 2020

(65) Prior Publication Data
US 2022/0299845 A1   Sep. 22, 2022

Related U.S. Application Data

(60) Provisional application No. 62/858,176, filed on Jun. 6, 2019.

(51) Int. Cl.
*G03B 15/07* (2021.01)
*G06T 15/50* (2011.01)

(52) U.S. Cl.
CPC ............ *G03B 15/07* (2013.01); *G06T 15/503* (2013.01)

(58) Field of Classification Search
None
See application file for complete search history.

(56) References Cited

U.S. PATENT DOCUMENTS

| 4,804,983 A | 2/1989 | Thayer |
| 4,918,321 A | 4/1990 | Klenk et al. |

(Continued)

FOREIGN PATENT DOCUMENTS

| CN | 207560161 U | 6/2018 |
| DE | 202017002782 U1 | 6/2017 |

(Continued)

OTHER PUBLICATIONS

Int'l Search Report for PCT/US2020/036573, dated Sep. 23, 2020.
(Continued)

*Primary Examiner* — Rodney E Fuller
(74) *Attorney, Agent, or Firm* — SNELL & WILMER L.L.P.

(57) ABSTRACT

A system and method are provided for determining surface defects of an object under study. A photographic tool is employed to produce real-time blending of a series of images of a static object where each of the individual images are illuminated under a different lighting condition with respect to the static object. The achieved effect is similar to what is experienced when looking at a painted surface from different perspectives in order to see if there are any imperfections. For example, in the case of automotive photography, paint problems, sheen differences, scratches, dents, and small dings may only be visible when the vehicle is lit from a specific or correct angle.

20 Claims, 15 Drawing Sheets

(56) References Cited

U.S. PATENT DOCUMENTS

| | | |
|---|---|---|
| 5,436,726 A | 7/1995 | Ventura et al. |
| 5,446,515 A | 8/1995 | Wolfe |
| 5,636,024 A | 6/1997 | Crookham et al. |
| 5,726,705 A | 3/1998 | Imanishi et al. |
| 5,778,258 A | 7/1998 | Zamoyski |
| 6,012,825 A | 1/2000 | Horner et al. |
| 6,147,752 A | 11/2000 | Hewitt et al. |
| 6,266,138 B1 | 7/2001 | Keshavmurthy |
| 6,320,654 B1 | 11/2001 | Alders et al. |
| 6,513,941 B1 | 2/2003 | Perrier et al. |
| 6,901,384 B2 | 5/2005 | Lynch et al. |
| 6,950,807 B2 | 9/2005 | Brock |
| 7,212,308 B2 | 5/2007 | Morgan |
| 7,945,953 B1 | 6/2011 | Sprague |
| 7,954,953 B2 | 6/2011 | Sprague |
| 8,050,735 B2 | 11/2011 | Feke et al. |
| 8,112,325 B2 | 2/2012 | Foy et al. |
| 9,037,968 B1 | 5/2015 | Pringle et al. |
| 9,046,740 B1 | 6/2015 | Smithweck |
| 9,113,784 B2 | 8/2015 | Feke et al. |
| 9,302,190 B1 | 4/2016 | Jennings |
| 9,412,203 B1* | 8/2016 | Garcia, III ......... G06Q 30/0609 |
| 9,429,817 B1 | 8/2016 | Harder et al. |
| 10,311,636 B1 | 6/2019 | Falstrup et al. |
| 10,814,800 B1* | 10/2020 | Gould ................. B60R 25/1004 |
| 10,824,055 B1* | 11/2020 | McGuire ................... F21S 4/28 |
| 11,412,135 B2 | 8/2022 | Scheich |
| 2001/0020933 A1 | 9/2001 | Maggioni |
| 2002/0082860 A1 | 6/2002 | Johnson |
| 2002/0085219 A1 | 7/2002 | Ramamoorthy |
| 2002/0105513 A1 | 8/2002 | Chen |
| 2002/0145660 A1 | 10/2002 | Kanade et al. |
| 2003/0107568 A1 | 6/2003 | Urisaka et al. |
| 2004/0078298 A1 | 4/2004 | Fusama |
| 2006/0114531 A1* | 6/2006 | Webb ................. G01N 21/8851 359/15 |
| 2006/0182308 A1 | 8/2006 | Gerlach et al. |
| 2006/0185550 A1 | 8/2006 | Zanzucchi et al. |
| 2006/0256959 A1 | 11/2006 | Hymes |
| 2007/0011083 A1 | 1/2007 | Bird et al. |
| 2007/0035539 A1 | 2/2007 | Matsumura et al. |
| 2007/0057815 A1* | 3/2007 | Foy ...................... H04N 5/2627 340/905 |
| 2007/0172216 A1 | 7/2007 | Lai |
| 2007/0211240 A1 | 9/2007 | Matsumoto et al. |
| 2007/0230824 A1 | 10/2007 | Alvarez |
| 2008/0106593 A1 | 5/2008 | Arfvidsson et al. |
| 2008/0187182 A1 | 8/2008 | Abe |
| 2008/0250585 A1 | 10/2008 | Auer et al. |
| 2009/0160930 A1 | 6/2009 | Ruppert |
| 2010/0067801 A1 | 3/2010 | Van Den Hengel et al. |
| 2010/0238290 A1 | 9/2010 | Riley et al. |
| 2010/0306413 A1 | 12/2010 | Kamay |
| 2011/0080487 A1 | 4/2011 | Venkataraman et al. |
| 2011/0102744 A1 | 5/2011 | Saad et al. |
| 2011/0221904 A1 | 9/2011 | Swinford |
| 2012/0087643 A1 | 4/2012 | Paramadilok |
| 2013/0057678 A1 | 3/2013 | Prior et al. |
| 2013/0107041 A1 | 5/2013 | Norem et al. |
| 2014/0009275 A1 | 1/2014 | Bowers et al. |
| 2014/0152806 A1* | 6/2014 | Hauk .................... G03B 37/02 348/121 |
| 2014/0192181 A1 | 7/2014 | Taylor et al. |
| 2014/0235362 A1 | 8/2014 | Fox et al. |
| 2014/0268627 A1 | 9/2014 | Contreras et al. |
| 2015/0012168 A1 | 1/2015 | Kuklish et al. |
| 2015/0077564 A1 | 3/2015 | Swindord |
| 2015/0111601 A1 | 4/2015 | Fagan |
| 2015/0227296 A1 | 8/2015 | Pringle et al. |
| 2016/0100087 A1 | 4/2016 | Scheich |
| 2017/0051547 A1 | 2/2017 | Albrecht |
| 2017/0148102 A1* | 5/2017 | Franke ............... G06Q 30/0601 |
| 2017/0180696 A1 | 6/2017 | Broughton |
| 2017/0264936 A1 | 9/2017 | Depies et al. |
| 2018/0084224 A1 | 3/2018 | McNelley et al. |
| 2018/0160019 A1 | 6/2018 | Scheich |
| 2019/0011806 A1* | 1/2019 | Zilban .................. B62D 63/061 |
| 2019/0056483 A1 | 2/2019 | Bradley et al. |
| 2019/0235737 A1 | 8/2019 | Kuribayashi |
| 2019/0244336 A1 | 8/2019 | Wakisaka et al. |
| 2019/0253701 A1 | 8/2019 | Himel et al. |
| 2020/0173930 A1 | 6/2020 | Alonie et al. |
| 2021/0144282 A1 | 5/2021 | Scheich |
| 2022/0060633 A1 | 2/2022 | Dillow |
| 2023/0007934 A1* | 1/2023 | Swinford ............... H04N 5/222 |

FOREIGN PATENT DOCUMENTS

| | | |
|---|---|---|
| DE | 202017002782 U1 * | 8/2017 |
| JP | S56132509 A | 10/1981 |
| JP | 2001013578 A | 1/2001 |
| JP | 2011530209 A | 12/2011 |
| WO | 2005022252 A1 | 3/2005 |
| WO | 2021021864 A1 | 2/2021 |

OTHER PUBLICATIONS

In Re Venner et al., No. 6391, LexisNexis; United States Court of Customs and Patent Appeals; Oral argument Nov. 7, 1958, Dec. 19, 1958.

Credit Acceptance Corp, Guaranteed Credit Approval, Auto Loan; http://www.insider-car-buying-tips.com/credit_acceptance_corp.html; accessed Dec. 17, 2013.

Auto Success; Credit Acceptance's Upgraded Credit Approval Processing System Simplifies Approval Process; vol. 1 Issue 33; http://www.imakenews.com/autosuccess/e_article001075242.cfm?x=bgB6V1j,b7jJcq29,w; accessed Dec. 17, 2013.

Credit Acceptance Corp (CACC.OQ) Company Profile | Reuters.com; http://www.reuters.com/finance/stocks/companyProfile?symbol=CACC.OQ; accessed Dec. 17, 2013.

Credit Acceptance Corporation—Annual Report; United States Securities and Exchange Commission; Washington D. C. 20549; Form 10-K; Annual Report Pursuant to Section 13 or 15(d) of the Securities Exchange Act of 1934. http://www.ir.creditacceptance.com/secfiling.cfm?filing1D=885550-13-18&CIK=885550; accessed Dec. 17, 2013.

* cited by examiner

VEHICLE PHOTOGRAPHIC SYSTEM FOR IDENTIFICATION OF SURFACE IMPERFECTIONS

RELATED APPLICATIONS

This application claims priority benefit of U.S. Provisional Application Ser. No. 62/858,176 filed 6 Jun. 2019, the contents of which are hereby incorporated by reference.

FIELD OF THE INVENTION

The present invention in general relates to a system for photographing vehicles; and in particular, to a photographic enclosure where an automated process captures a series of vehicle images illuminated by multiple lighting configurations for identification of vehicle surface imperfections.

BACKGROUND OF THE INVENTION

Online auto sales and auto auctions have been growing in popularity. One of the most popular online auctions to buy vehicles from is eBay™. On eBay Motors™, a user can create an account and put their vehicles up for auction. Other popular websites include Cars.com™. Typically, online vehicle sales are based solely on images of the vehicle, since the buyer is in a remote location and is unable to view the vehicle in question in person. Thus, many high quality images are required of the vehicle from many perspectives to allow a buyer to gain an understanding of a subject vehicle's condition and appearance. FIGS. 1A and 1B are typical non-studio quality vehicle photographs that are used to list vehicles for sale. The images shown in FIGS. 1A and 1B are of low quality and require a dedicated employee to move vehicles and physically move around the subject vehicle to take the pictures. FIG. 1C illustrates reflection of the floor on the surfaces of the vehicle. The photographer also has to manually collate the images, name, and upload the files, which is a labor intensive and time consuming task, considering one photographer may be required to shoot upwards of 75 vehicles a day.

Furthermore, producing high quality images is not only time consuming, but is costly and requires a studio set up. Vehicle images are particularly hard to obtain without unwanted reflections of the photographer or the surroundings; however reflection free images are critical to be able to discern surface imperfections, scratches, and dents on a vehicle surface. FIGS. 2A and 2B illustrate an existing studio configuration 1 for generating a contrast break line 2 on a vehicle with additive lighting. The bottom edge 4 of a light box 6 creates the break line 2 between highlight and shadow. FIGS. 3A and 3B illustrate an existing studio configuration 8 for generating a contrast break line 2 on a vehicle with subtractive lighting. The bounce fill light is a large source and makes a soft reflection in the sheet metal. A gray wall is added to "subtract" the reflection from the lower half of the truck to create contrast and shape.

While these studio shots are effective in creating high quality vehicle images, the studio shots are not amenable to the high throughput required for high volume vehicle sales. Thus there is a need to be able to rapidly produce high quality reflection free images of vehicles from multiple angles and perspectives.

In order to increase throughput for creating high quality vehicle images a drive through photographic tunnel as disclosed in U.S. Pat. No. 10,063,758 issued Aug. 28, 2018 and a circular dome photographic booth as disclosed in U.S. patent application Ser. No. 15/834,374 filed Dec. 7, 2017 both of which are included herein in their entirety have been implemented. Both the photographic tunnel and circular dome have a plurality of cameras mounted within the walls for recording images of a vehicle that are uploaded to a database that is used to generate image data from the vehicle positioned in the structure. The systems further include a lighting system and a tracking system to actuate one or more of the plurality of cameras and lights in a predetermined sequence and combination based on the position of the vehicle within the circular domed structure.

U.S. Pat. No. 9,046,740 discloses a vehicle photographic studio with a stationary circular platform a vertical upright curved wall defining a backdrop that partially surrounds the platform, a front curved overhead member mounted across a side opening in the wall, and a plurality of spaced apart rollers rotatably mounted on a lower end portion of the wall and engaged with the track so as to mount the wall upon the track for undergoing revolvable movement along the track and about the platform to relocate the side opening of the wall at any selected angular position in relation to the platform. However, the disclosed concept while providing a controlled background that eliminates confusing backgrounds of a parking lot as shown in FIG. 1B fails to control reflections in the vehicle surface as was previously shown in FIG. 1C.

However, these existing vehicle photographic solutions are not well suited for the identification of surface imperfections and defects including scratches and dents. Thus, online buyers purchasing a vehicle must rely on the seller to fully disclose the cosmetic condition of the subject vehicle.

Thus, there continues to be need for improved photographic chambers that are able to discern and identify imperfections and dents in surfaces of vehicles being photographed within photographic chambers.

SUMMARY OF THE INVENTION

A system is provided for determining vehicle surface defects. The system includes an enclosable drive-in structure having one or more doors, a wall and a ceiling, and a plurality of cameras. At least one of camera is mounted in each of the one or more doors, the wall and the ceiling. In addition, a cluster of lighting elements are associated with each of the plurality of cameras, where the clusters of lighting elements are positioned in the one or more doors, the wall, and the ceiling. The system further includes a trigger mechanism for each of the plurality of cameras to take exposures through an automated lighting cycle of each of the associated clusters of lights as a light beam generated by the cluster of lighting elements sweeps across a vehicle surface. Each of the plurality of cameras provides images or video to a computing system.

A process is provided for photographing a vehicle with the system as described above. The process includes driving the vehicle through a door into of an enclosable drive-in structure, and selectively illuminating a first cluster of lights arrayed in the structure and associated with a first camera. A first set of photographs of the vehicle are collected with the illumination from the first subset of lights, and are supplied to a computer workstation. A blended photograph is created that is made up of the first set of photographs at the computer workstation. The blended image is then analyzed.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DESCRIPTION OF THE INVENTION

Figure 1A:
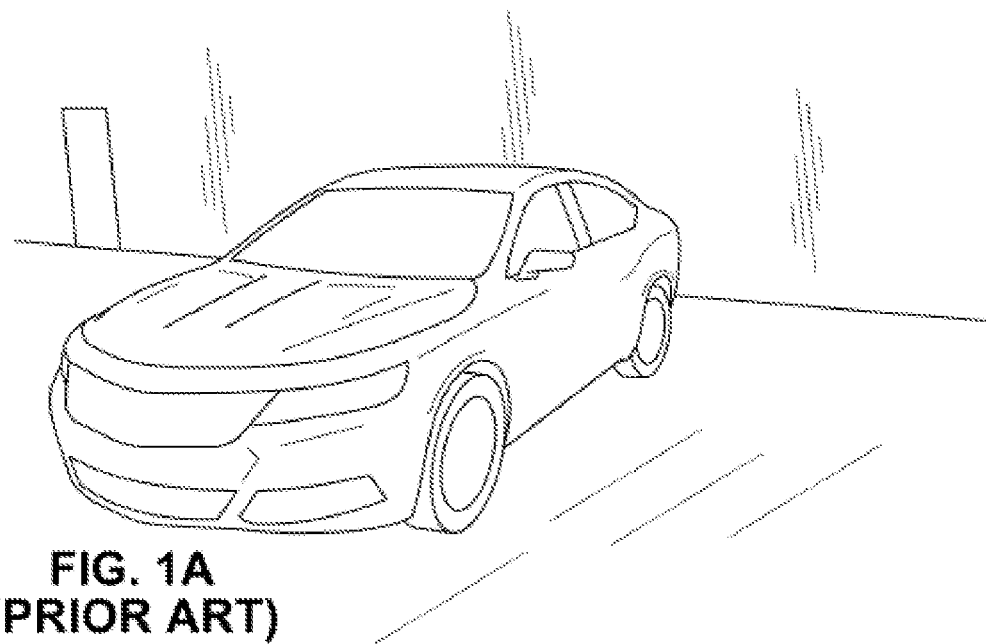
FIGS. 1A and 1B are typical non-studio quality vehicle photographs rendered as line drawings.
Figure 1B:
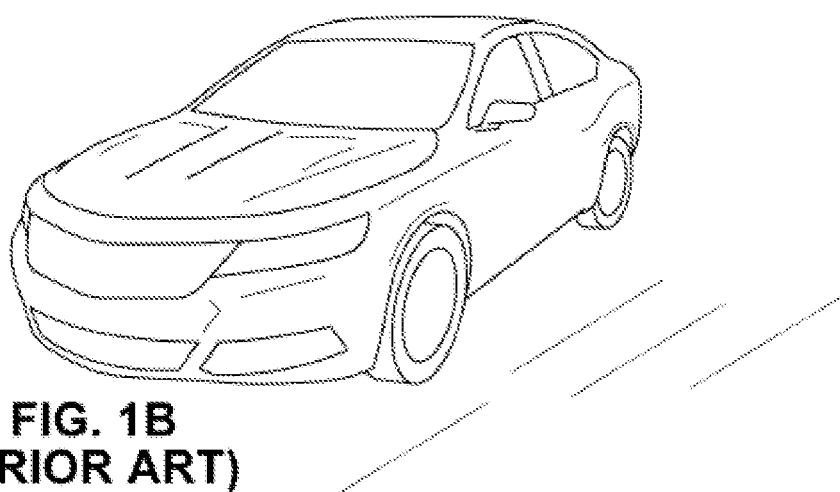
Figure 1C:
FIG. 1C illustrates a studio shot with uncontrolled reflections in a vehicle surface photographs rendered as a line drawings.
Figure 2A:
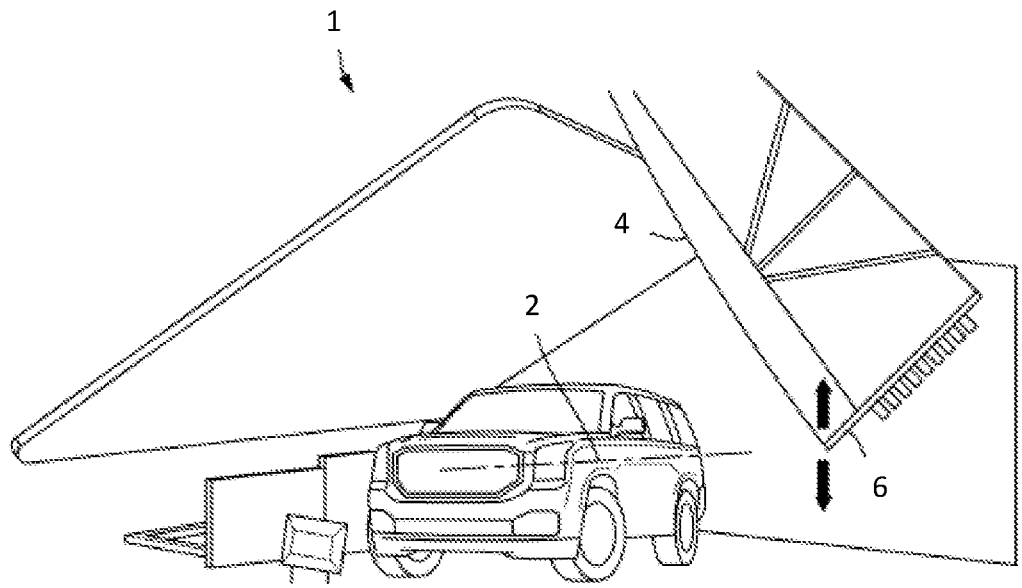
FIGS. 2A and 2B illustrate an existing studio configuration for generating a contrast break line on a vehicle with additive lighting photographs rendered as line drawings.
Figure 2B:
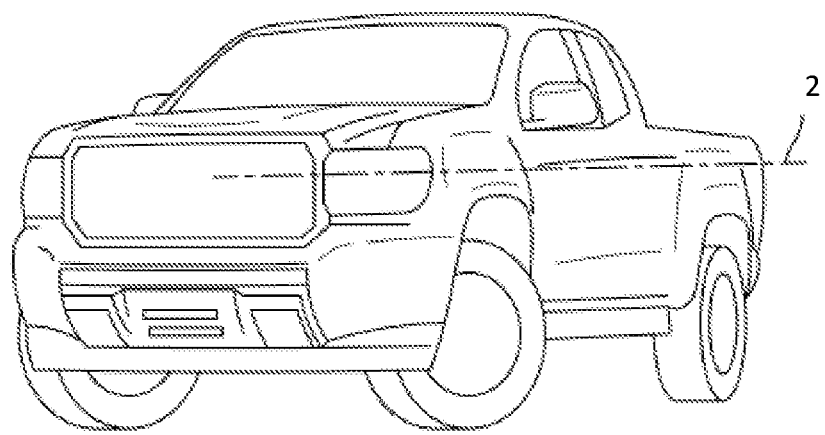
Figure 3A:
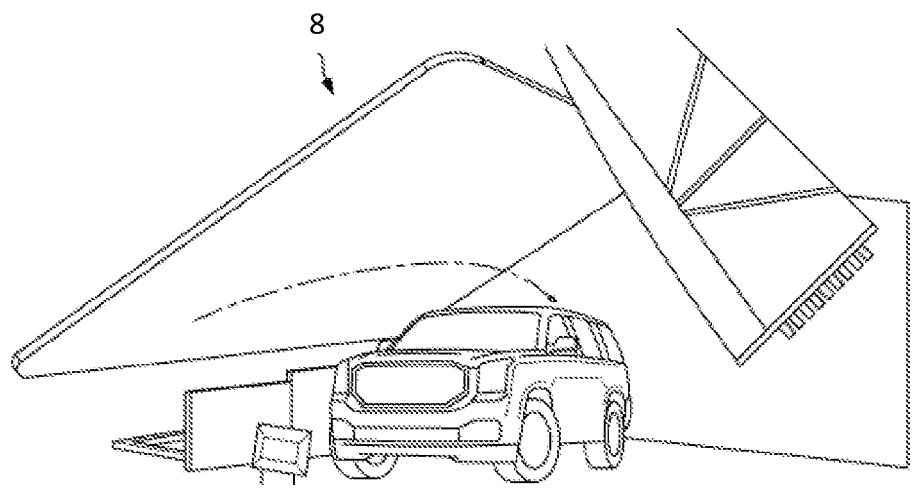
FIGS. 3A and 3B illustrate an existing studio configuration for generating a contrast break line on a vehicle with subtractive lighting photographs rendered as line drawings.
Figure 3B:
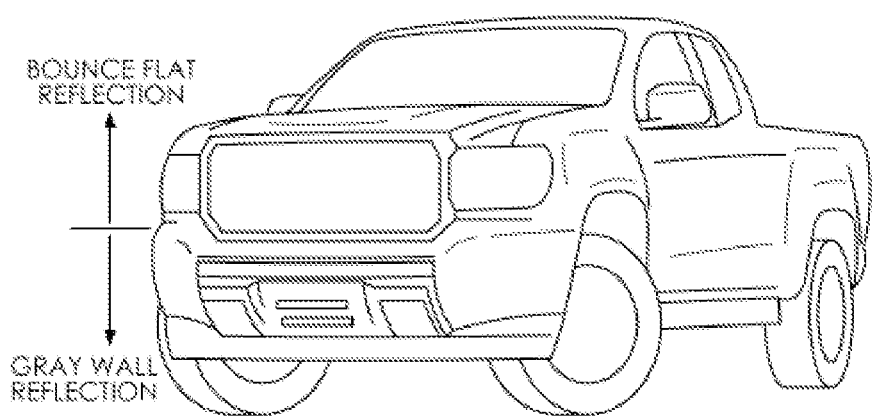

The present invention has utility as a photographic tool that allows real-time blending of a series of images of a static object where each of the individual images are illuminated under a different lighting condition with respect to the static object. The achieved effect is similar to what is experienced when looking at a painted surface from different perspectives in order to see if there are any imperfections. For example, in the case of automotive photography, paint problems, sheen differences, scratches, dents, and small dings may only be visible when the vehicle is lit from a specific or correct angle.

In a specific inventive embodiment, a vehicle is subjected to an automated process of specialized photography with many lighting angles and styles to generate a series of images. A playback interface may then be used to "roll" the lighting around the subject vehicle to be inspected. In this way the image set revels more surface detail than any normal static photo could. Thus, embodiments of the inventive process and system may be used in detecting surface defects, dents, or previous body work performed on a subject vehicle.

In embodiments of the invention with respect to each camera position a lighting angle change is made for each of the series photos taken from the camera position that allows remote vehicle inspection for surface defects. Inventive embodiments allow an untrained operator to capture vehicle inspection images during the intake process for that vehicle. The detailed inspection is then done remotely by a highly skilled technician. Thereby one technician at a display monitor using an inventive embodiment of the photo blending interface may inspect many more vehicles per day across multiple facilities. Optimizing the work of that inspector while reducing physical fatigue. Embodiments of the photo blending may also be made available to the buying public as in the case of vehicle auctions allowing the bidders to better preview the vehicle. In such a case the auction house would simply capture the assets and post them online without the need for any skilled technician. This puts the responsibility of the vehicle's surface condition on the bidding consumer.

In inventive embodiments a predetermined blend of images may be used to create an opening view representing a normally lit object. When the playback interface is active the viewer may control the blend between different lighting angles giving the same experience as one would get in person by moving their head around to get a better angle of light across the surface to be inspected. In embodiments the intensity of the cross lighting may be controlled from a subtle highlighting of an area to complete crosslight, as well as highlight fading across to black.

Inventive embodiments may be scaled to photograph large subjects such as vehicles as well as smaller versions of the system may be used to examine the textures of smaller objects or the condition of such things where surface quality would affect the value of the object. Illustrative examples include the condition of collectables (baseball cards, comic books, toys, coins, stamps) or artwork.

It is to be understood that in instances where a range of values are provided herein, that the range is intended to encompass not only the end point values of the range, but also intermediate values of the range as explicitly being included within the range and varying by the last significant figure of the range. By way of example, a recited range of from 1 to 4 is intended to include 1-2, 1-3, 2-4, 3-4, and 1-4.

Figure 4:
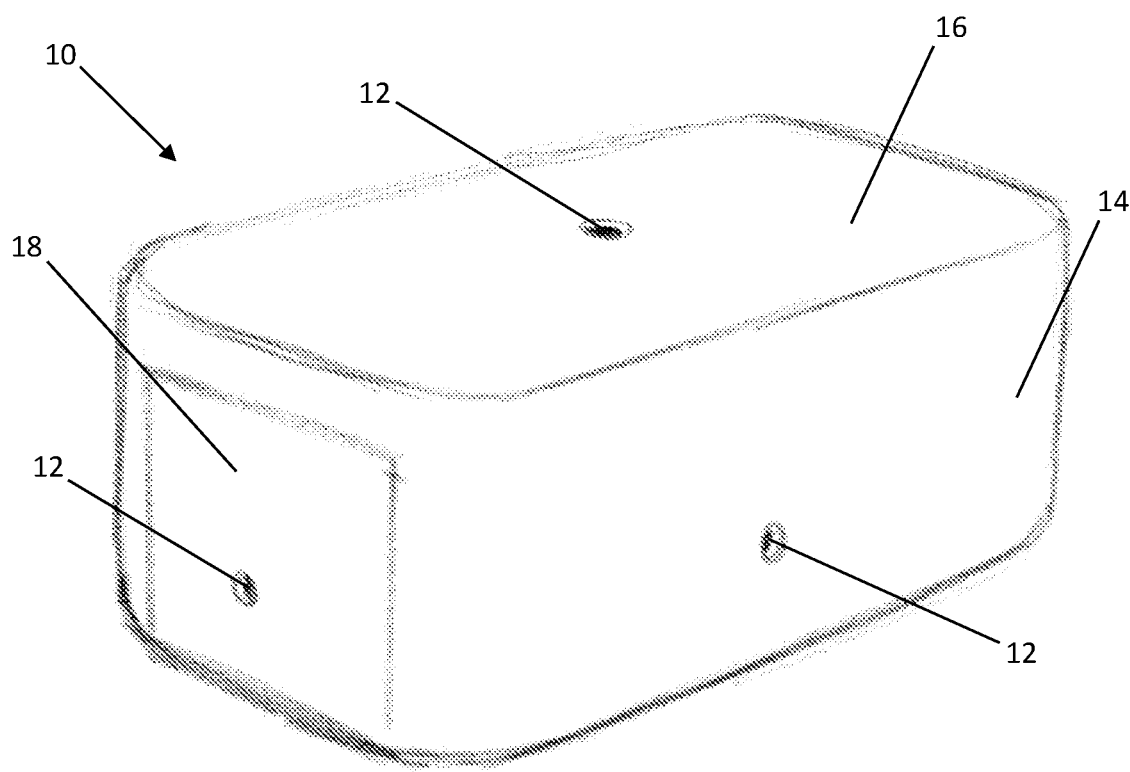
FIG. 4 illustrates a photographic booth with a cameras mounted in the walls and ceiling that provides controlled surface reflections on surfaces of the vehicles being photographed as well as lighting configurations that assist in detecting surface defects, dents, and previous body work in accordance with embodiments of the invention.
Figure 5:
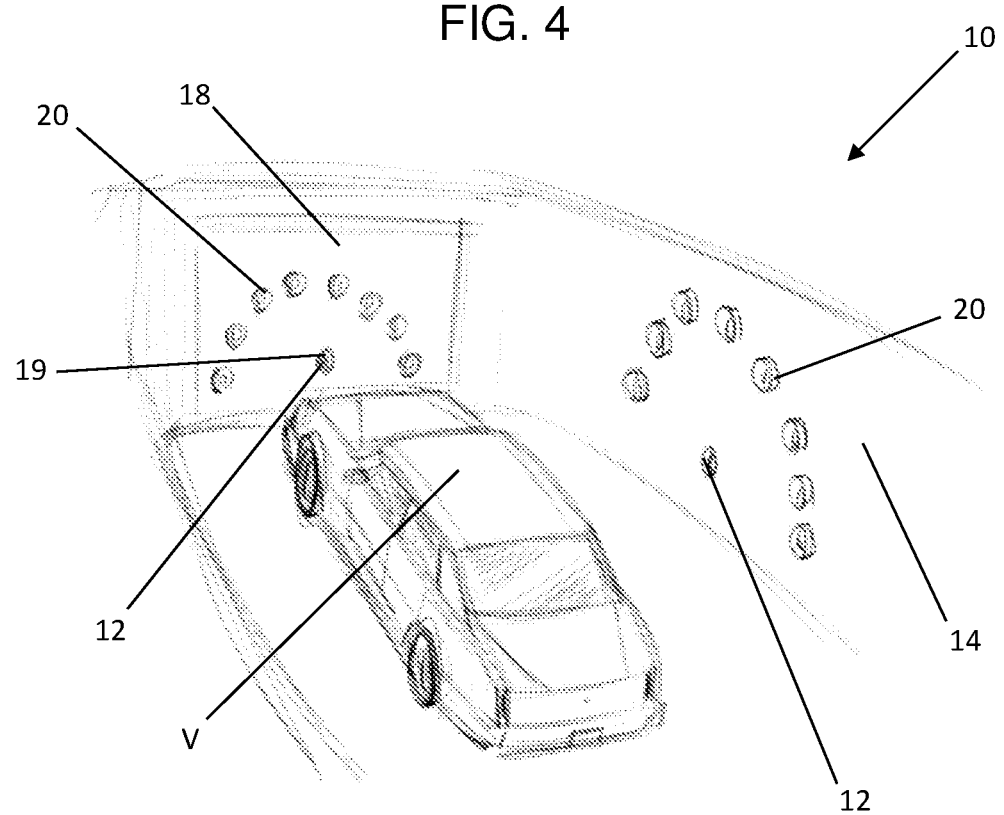
FIG. 5 illustrates a partial cutaway view with the roof removed of the photographic booth of FIG. 4 with a vehicle positioned in the center of a photographic stage with cameras and lighting elements arranged in the walls and door of the photographic booth.

Referring now to the figures, FIG. 4 illustrates a photographic booth 10 with camera apertures 12 mounted in the walls 14, ceiling 16, and door(s) 18. Cameras 12C are fix mounted at the camera apertures 12. While only one door 12 is shown it is appreciated that a second door as an opposing door may be present to allow the drive through of the vehicle. FIG. 5 illustrates a partial cutaway view with the ceiling 16 removed from the photographic booth 10 of FIG. 4 with a vehicle V positioned in the center of a photographic stage. The interior of the walls 14, ceiling 16, and door(s) 18 are painted black or another color to control reflections, and provide controlled surface reflections on surfaces of the vehicles being photographed. The black interior surfaces stop the sheet metal of the subject vehicle V from reflecting any of the environment. The vehicle exposure will be made only with direct light from the lighting elements 20 avoiding any reflections from adding false shapes to the surface of the vehicle V. Each fixed camera takes exposures through the automated lighting cycle of the cluster of lights 20 positioned on the wall 14, ceiling 16, and door(s) 18 of a particular camera 12C that generates an image stack. A trigger mechanism 19 for each of the cameras take exposures through an automated lighting cycle of each of the associated clusters of lights as a light beam generated by the cluster of lighting elements sweeps across a vehicle surface. The clusters of lighting elements 20 are shown in a semi-circle, though it is appreciated that alternative configurations or arraignments of the lighting elements are possible. The lighting configurations assist in detecting surface defects, dents, and previous body work in accordance with embodiments of the invention.

Figure 6:
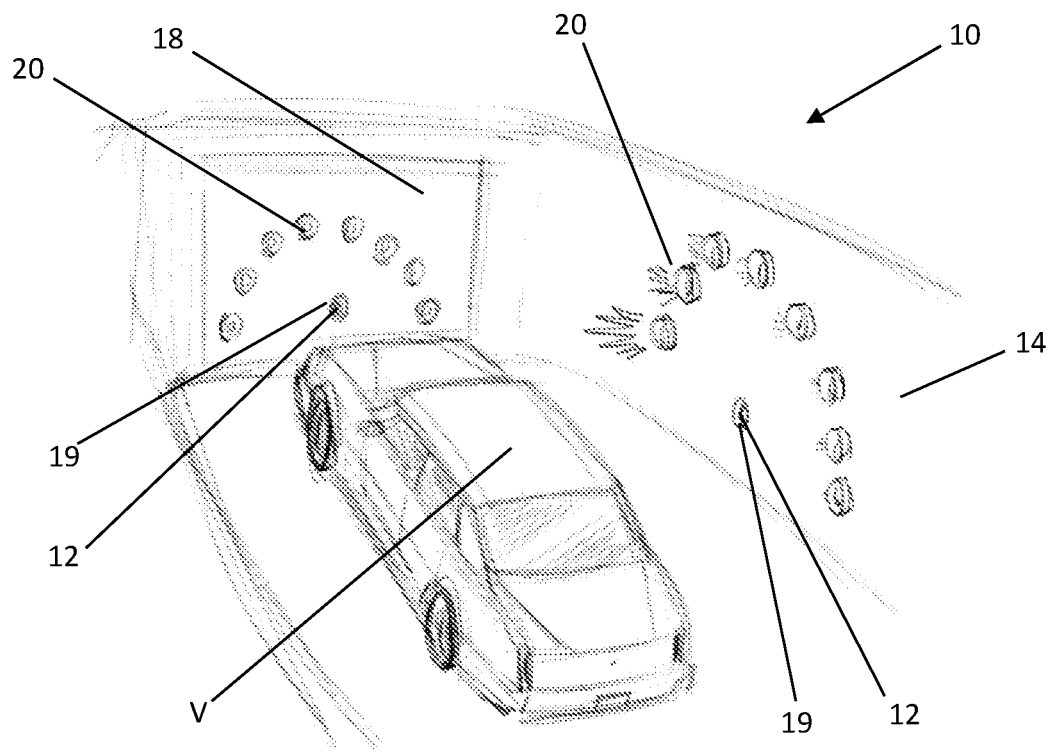
FIG. 6 illustrates the selective activation of lighting elements in the photographic booth shown in FIGS. 4 and 5 where the selective lighting of each of the lighting groups and multiple exposures from the related cameras allows for detection of surface defects, dents, and previous body work in accordance with embodiments of the invention.

FIG. 6 illustrates the selective activation of lighting elements in the photographic booth 10 shown in FIGS. 4 and 5 where the selective lighting of each of the lighting groups and multiple exposures from the related cameras allows for detection of surface defects, dents, and previous body work on the vehicle V in accordance with embodiments of the invention.

Figure 7:
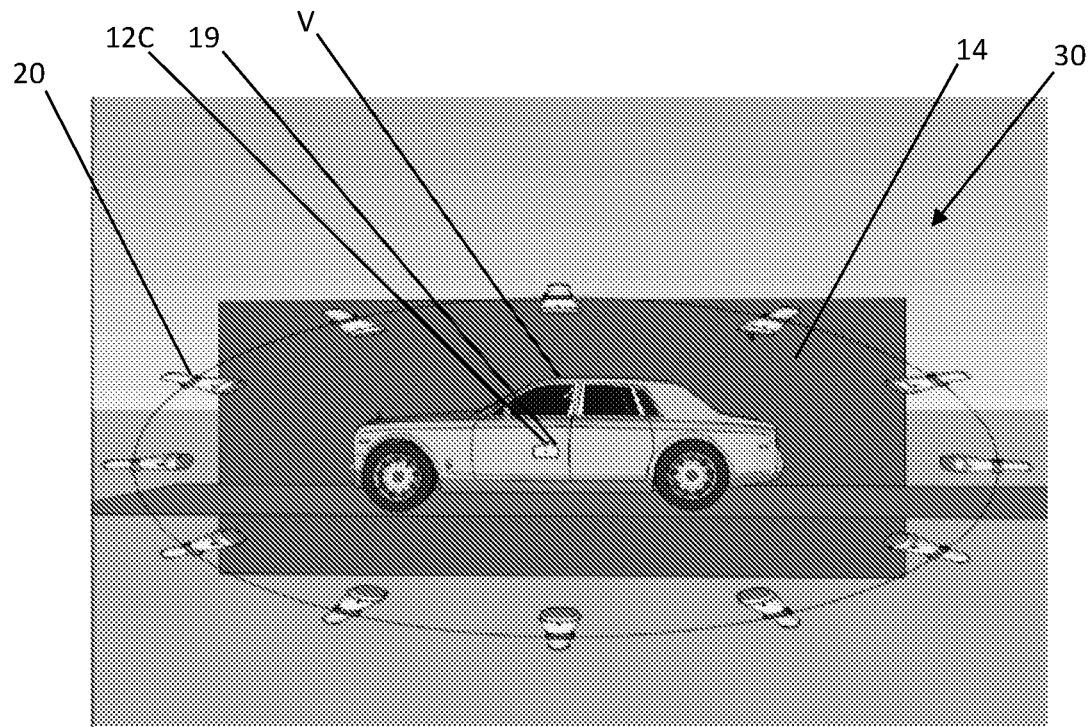
FIG. 7 illustrates a partial cutaway view of a photographic booth with a lighting cluster associated with a fixed camera according to an embodiment of the invention.

FIG. 7 illustrates an embodiment 30 of a partial cutaway view of a photographic booth with a circular ring of lighting elements 20 associated with a fixed camera 12C according to an embodiment of the invention. Each lighting element 20 rakes the surface to reveal the texture of the vehicles surface.

Figure 8A:
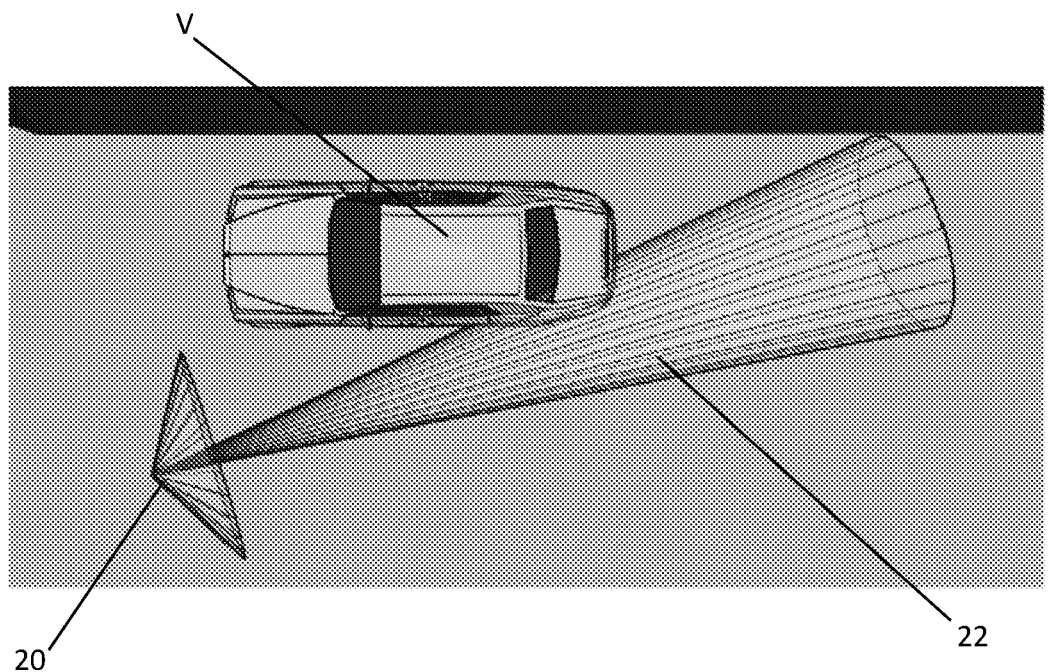
FIG. 8A illustrates a beam of light generated from one of the lighting elements of the lighting cluster of FIG. 7, where the lighting element rakes across the surface of the vehicle to reveal the texture of the vehicles surface in accordance with embodiments of the invention.
Figure 8B:
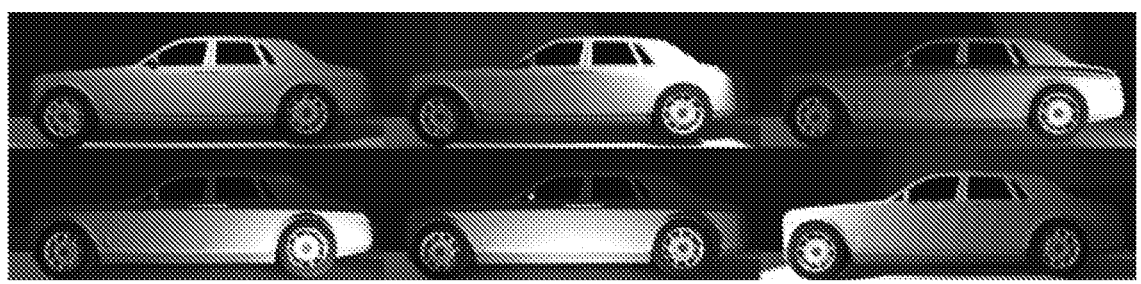
FIG. 8B is a series of pictures showing a light beam raking across the driver side surfaces of a vehicle in accordance with embodiments of the invention.

FIG. 8A illustrates a beam of light 22 generated from one of the lighting elements of the lighting cluster of FIG. 7, where the beam of light 22 rakes across the surface of the vehicle V to reveal the texture of the surface of the vehicle. FIG. 8B is a series of pictures showing a light beam raking across the driver side surfaces of a vehicle.

Figure 9:
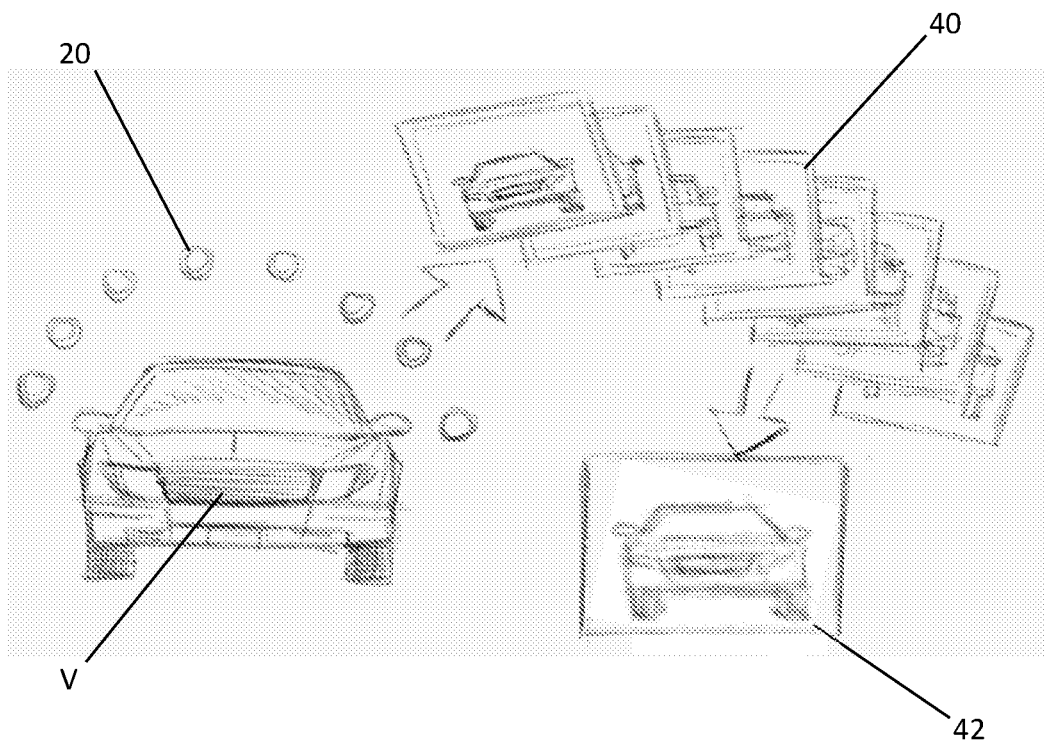
FIG. 9 illustrates an image stack of photos taken by a camera with a series of different lighting angles that are combined into a computer generated single blended image in accordance with embodiments of the invention.

FIG. 9 illustrates an image stack of photos 40 of a vehicle V taken by a camera with a series of different lighting angles that are combined into a computer generated single blended image 42 in accordance with embodiments of the invention.

Figure 10:
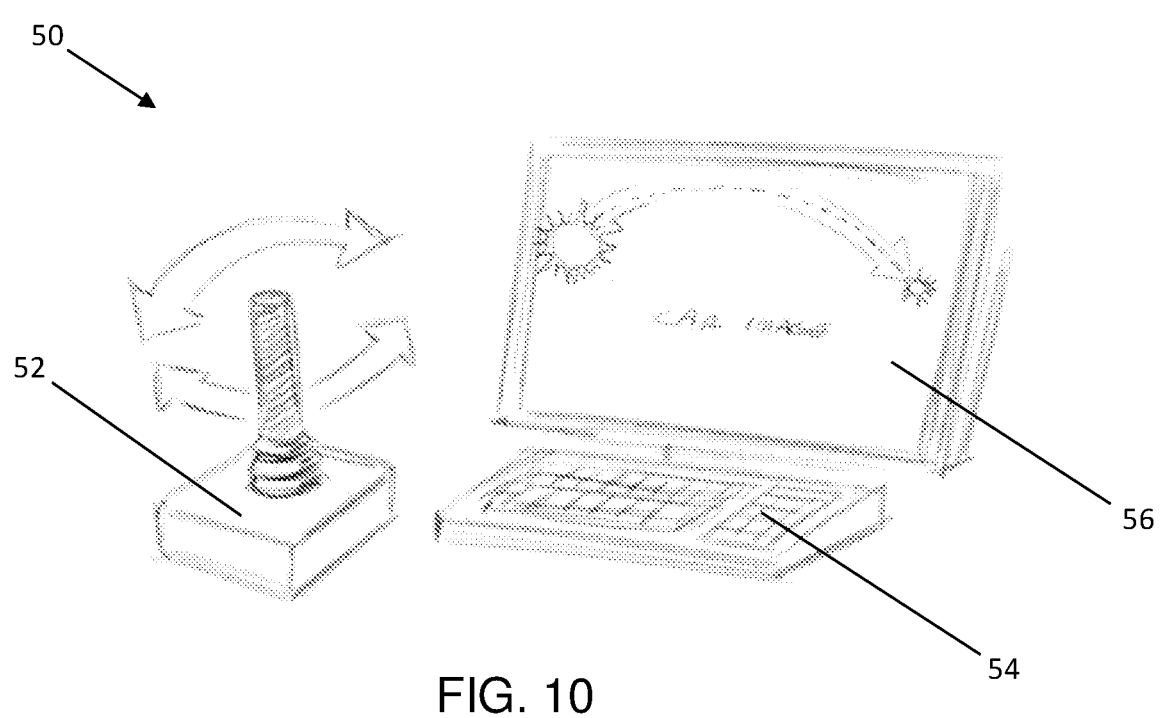
FIG. 10 illustrates a workstation and interface for identifying surface imperfections and defects based on the obtained images in accordance with embodiments of the invention.

FIG. 10 illustrates a computer workstation 50 with an input device illustratively including a mouse or joy stick controller 52, a data entry keyboard 54, and display interface 56 for identifying surface imperfections and defects based on the obtained images. The image stack 40 for each angle arrives at the computer workstation 50 and is imported in the viewer where the user selects images from the stack 40 to combine as a single blended image of that angle to see areas of interest better. Through the graphical user interface (GUI) of the workstation an operator can, zoom, pan, and change the lighting as needed to revel any surface issues that may need a closer look. It is appreciated that the display interface may be a touchscreen for controlling the GUI. The operator may add point annotations based on their findings and a grading scale may be applied to the image. Examples of annotations may include "this location needs further review"; "there is a mild defect here"; "there is a major defect here"; etc.

Through the use of the computer workstation 50 the user has the effect that is the same as looking down the side of the car and moving their head around to see a dent or scratch. In a similar manner that moving one's head causes the angle of light relative to the sheet metal to change—when light is aligned correctly dents and scratches become more visible. The same result can be had by keeping one's head in one place and moving a light source around the dented area.

As noted above a photography system produces a series of photographs of an automobile from a static camera. Each photograph is lit with directional lighting coming from a different direction. Within the "examination" software the user would see a single image. That image is a blend of several light sources. The user may then move the mouse or joystick 52 around which changes the percentage of which light sources get blended.

Figure 11:
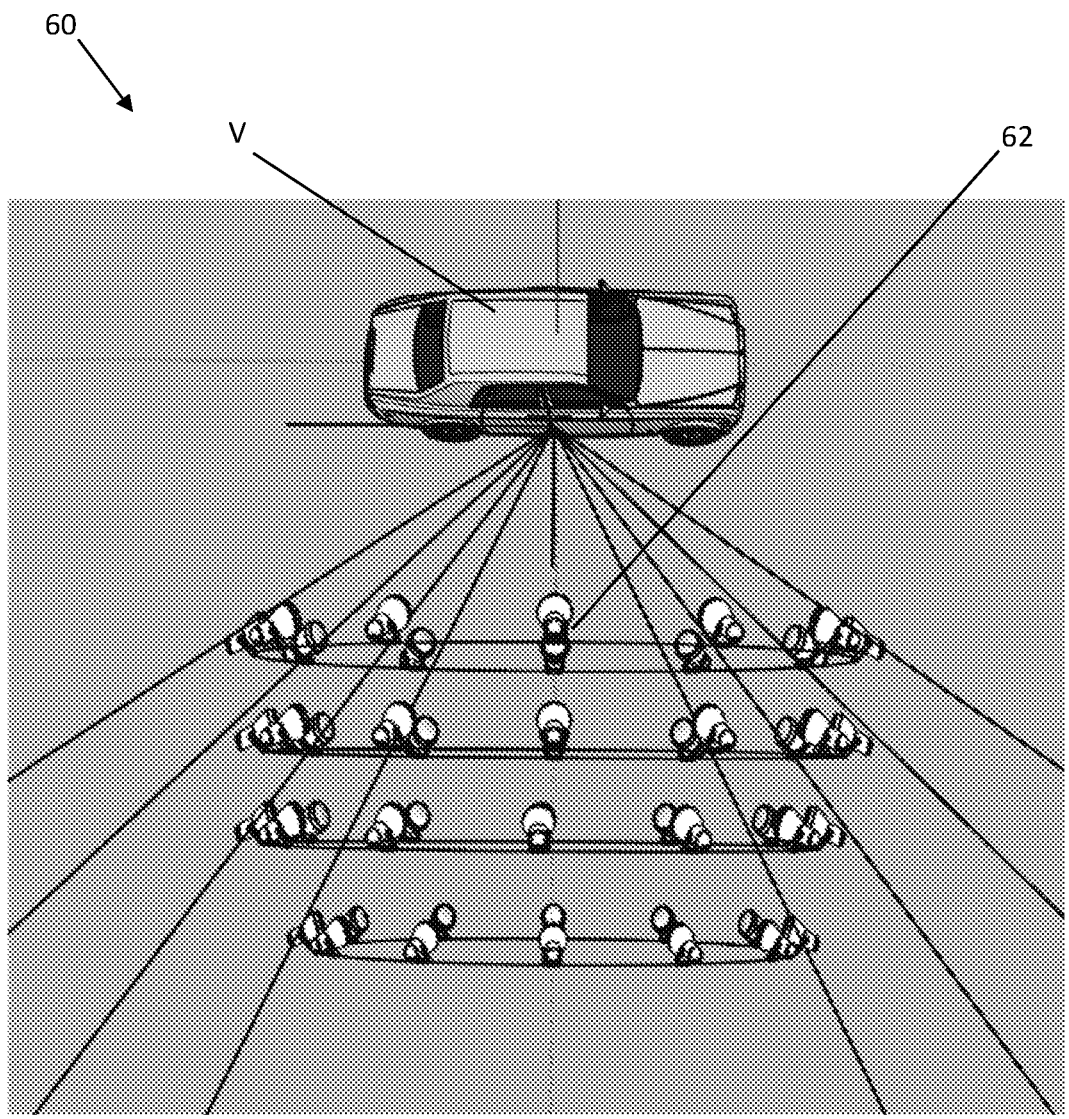
FIG. 11 illustrates concentric rings of lighting for converting an image to a point cloud for a three dimensional (3D) rendering of a vehicle.

FIG. 11 illustrates an embodiment 60 of concentric rings of lighting 62 for converting an image to a point cloud for a three dimensional (3D) rendering of a vehicle. The usage of many cross lights would be used with one or more cameras to generate photogrammetric depth data. This data could be analyzed against known reference data for the same make and model. Any differences between the two models would indicate body damage on the subject car.

Figure 12A:
FIG. 12A is an initial photograph (opening blend) of a vehicle in accordance with embodiments of the invention.

FIG. 12A is an initial photograph (opening blend) of a vehicle.

Figure 12B:
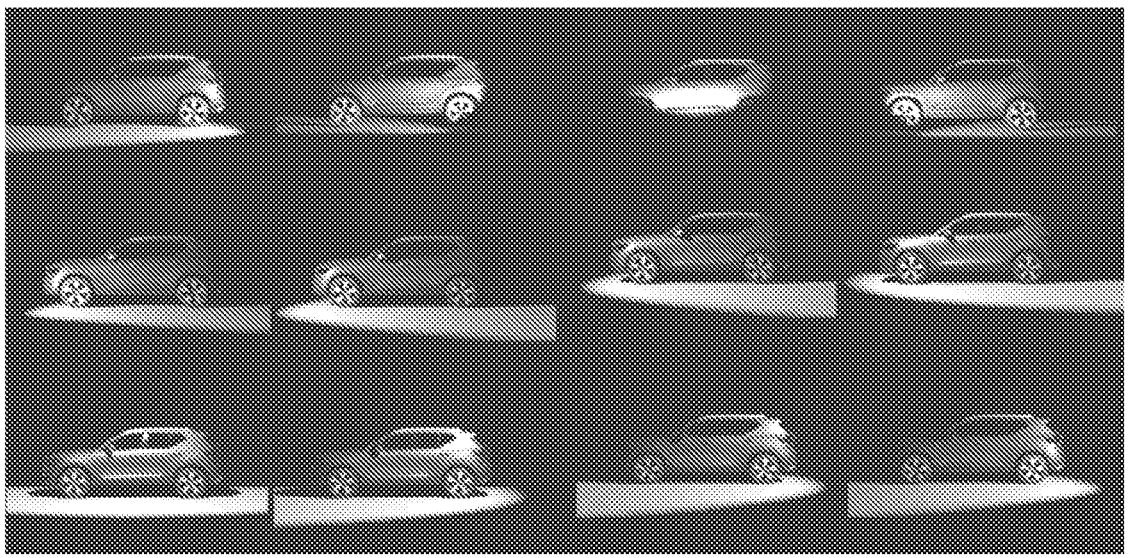
FIG. 12B shows a series of blended photographs with lighting at different positions on the surface of the vehicle in accordance with embodiments of the invention.

FIG. 12B shows a series of blended photographs at different positions on the surface of the vehicle of FIG. 12A.

Figure 12C:
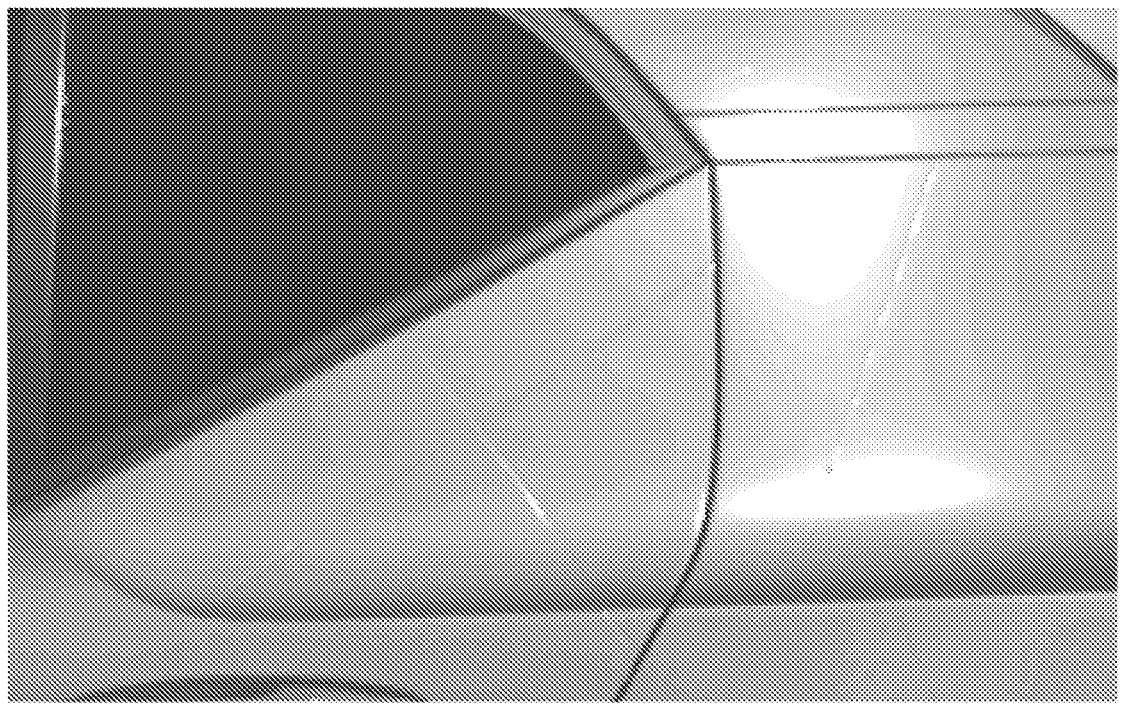
FIG. 12C illustrates a portion of the surface of the vehicle shown in FIGS. 12A and 12B where the surface defects are not visible in a standard automotive photograph become extremely pronounced when the lighting is at the correct angle for that defect in accordance with embodiments of the invention.

FIG. 12C illustrates a portion of the surface of the vehicle shown in FIGS. 12A and 12B where the surface defects not visible in a standard automotive photograph become extremely pronounced when the lighting is at the correct angle. It is noted that modern digital single-lens reflex (DSLR) cameras create images that are 8000 pixels wide. This resolution allows large amounts of data to be examined and allows the ability to zoom in much further than ever before.

Figure 13A:
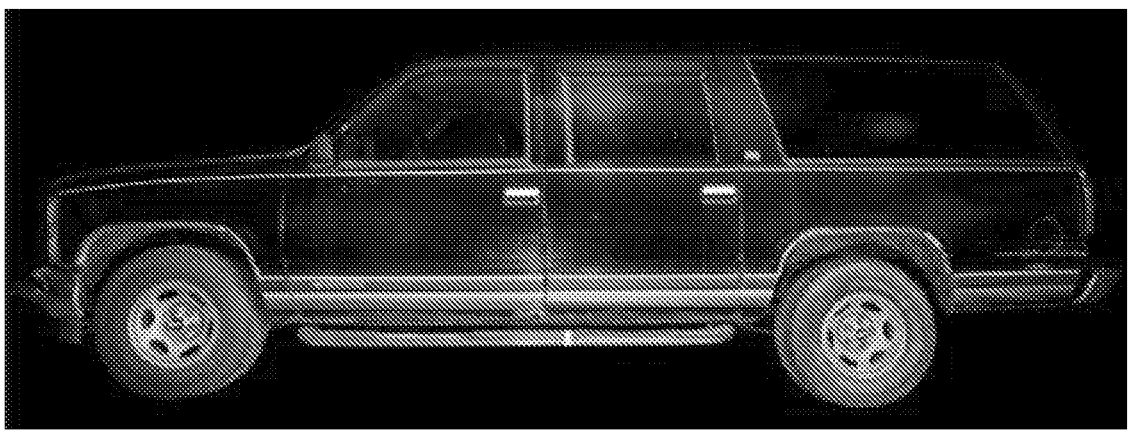
FIG. 13A is an initial photograph (opening blend) of a vehicle in accordance with embodiments of the invention.
Figure 13B:
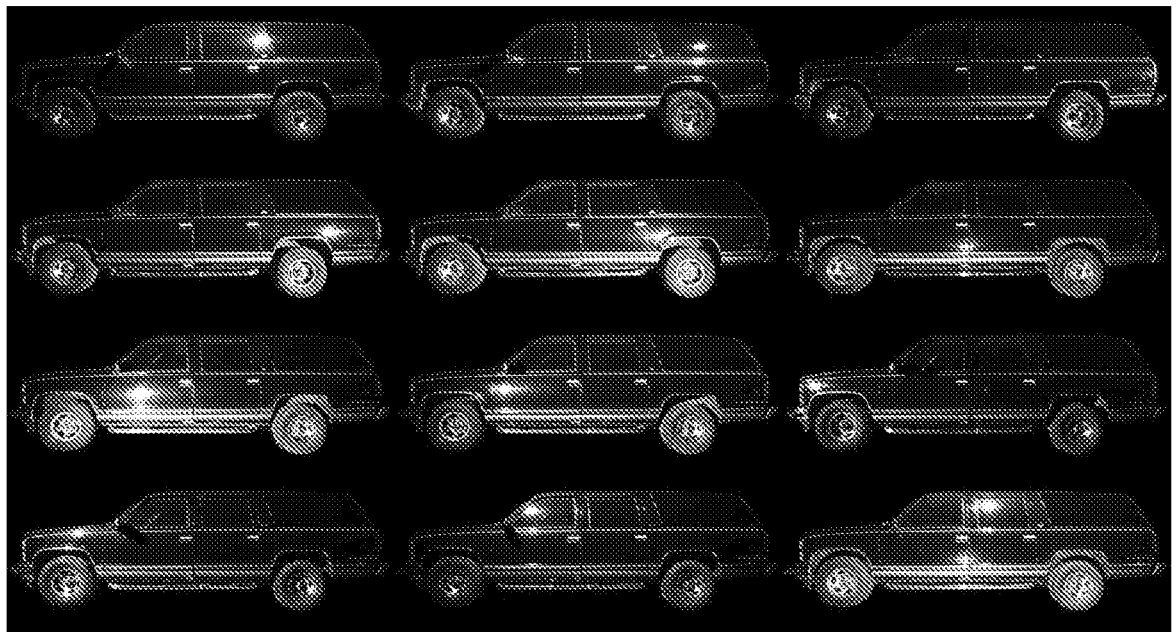
FIG. 13B shows a series of blended photographs with lighting at different positions on the surface of the vehicle in accordance with embodiments of the invention.
Figure 13C:
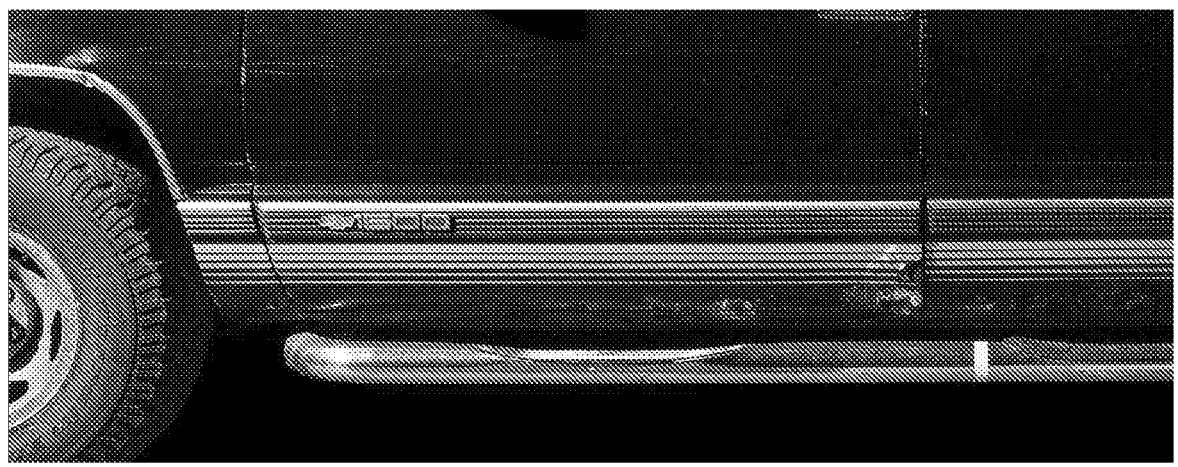
FIG. 13C is a close up view of one of the twelve photographs highlighting surface imperfections.

FIG. 13A is an initial photograph (opening blend) with equal amounts of the twelve photographs shown in FIG. 13B taken with lighting swept across the surface. A user at a workstation while moving their mouse or joystick will see light that will blend and shift around the twelve extremes as shown in FIG. 13B. FIG. 13C is a close up or zoomed in view showing vehicle surface imperfections including rust, scratches, and dents.

Figure 14A:
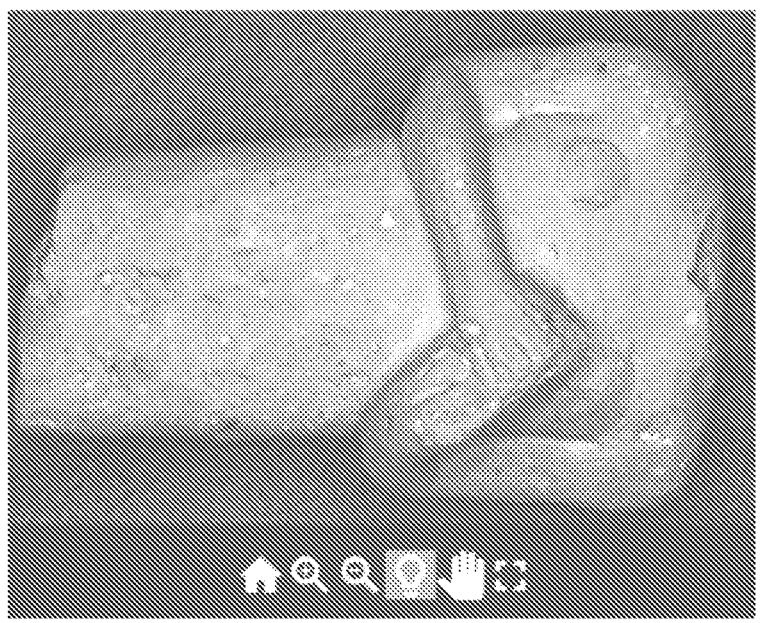
FIG. 14A is an initial photograph (opening blend) of an artifact with light rolled around the object in accordance with embodiments of the invention.

FIG. 14A is an initial photograph (opening blend) of an artifact with light rolled around the object.

Figure 14B:
FIG. 14B is a series of photographs of the artifact of FIG. 14A with light rolled around the object in accordance with embodiments of the invention.

FIG. 14B is a series of photographs of the artifact of FIG. 14A with light rolled around the object.

Figure 15:
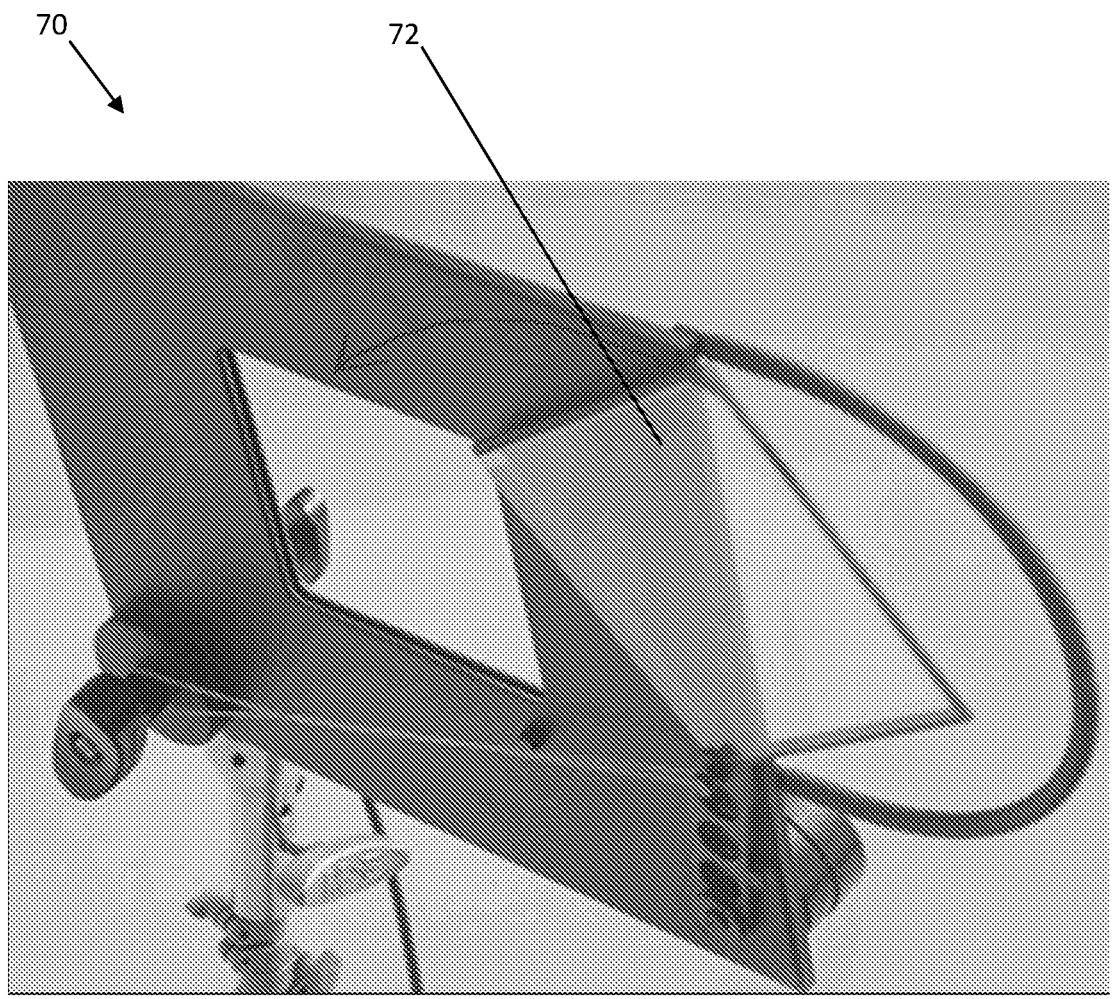
FIG. 15 is a photograph of a switchable filter or light polarizer that may be positioned in front of a lens of a camera.

FIG. 15 is a photograph of an embodiment 70 of a switchable filter or light polarizer 72 that may be positioned in front of a lens of a camera and/or of the lighting elements of the lighting clusters. In a specific embodiment the wavelength of the light may be varied to expose surface imperfections. For example infrared lighting, color polarization, and cross polarization (on and off axis) filtration may also be used to identify surface imperfections.

In specific inventive embodiments, machine learning may be employed for finding the imperfections in an examined surface automatically. The software would have to know the make and model of vehicle and the vehicle would have to be clean. The machine would be taught what the reference vehicle's natural body lines look like and through examining the sheet metal in all lighting scenes determine where an imperfection is. A high resolution laser scan may also be used to provide a comparison model. Each image is examined automatically running through the full lighting and filtration series. Areas of interest are flagged, and the flagged sections of each camera angle are compared and graded based on criteria discovered during the machine training process. Highly likely areas of surface imperfections are confirmed by humans and then feed back into the system to help further the artificial intelligence (AI) training.

Figure 16:
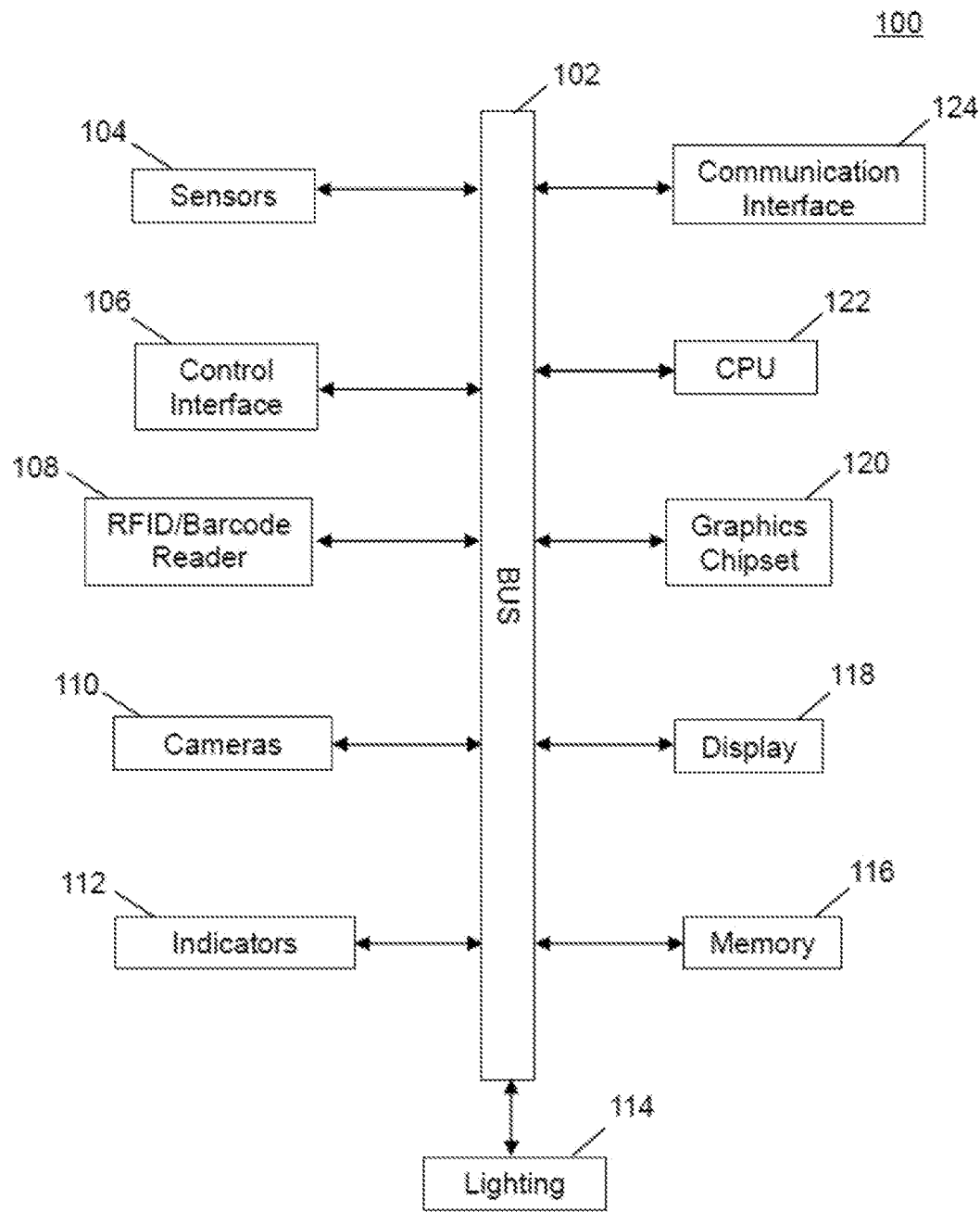
FIG. 16 is a system block diagram of the major components for photographing vehicles in accordance with embodiments of the invention.

FIG. 16 is a system block diagram 100 of the major components for photographing vehicles for surface imperfections in accordance with embodiments of the invention. A central process unit (CPU) 122 coordinates and controls the overall operation of the photographing system 100 that may be operated in the photographic structure 10. The communication interface 124 is representative of various links and input connections and devices illustratively including but not limited to wired and wireless links, optical drives, universal serial bus (USB), flash memory slot, and combinations thereof, for receiving and sending data that may or may not be in real time. The bus 102 links the various components in the system. Memory 116 serves as storage for operating programs and firmware for the photographic system 100. A database with vehicle and client information is stored in Memory 116. Memory 116 is made up of read-only memory ROM and random access memory (RAM). Graphics chipset 120 drives a display 56 of FIG. 10. The display 56 may be liquid crystal display (LCD), light emitting diode (LED), or other known display technologies. Control interface 106 may include knobs, buttons, and other touch sensitive controls for selecting various menu items or for inputting alphanumeric information. Sensors 104 sense the presence of a vehicle and the vehicle position. RFID/barcode 108 is a reader that detects and interprets tags mounted to vehicles or driver identification (ID) cards. Cameras 110 and lighting 114 are controlled and sequenced by the CPU 122. Indicators 112 provide visual feedback to system users. In inventive embodiments, the central process unit (CPU) 122, or master and node computers, in the case of many cameras in use—these processing nodes speedup download and system throughput, and the CPU 122 coordinates and controls the plurality of cameras in the photographic structure 10. In specific inventive embodiments, a communication interface connects the plurality of cameras via one or more of wired and wireless links, optical drives, universal serial bus (USB), flash memory slot, and combinations thereof for receiving and sending data.

The use of sequenced and automated image capture allows for the rapid image processing of vehicles for auction sales, dealer records, as well as car condition assessments for rental agencies, fleet management companies, public safety agencies, municipal and government agencies, etc. A complete set of vehicle images are collected in between 5 and 90 seconds allowing for high throughput imaging associated with an auto auction or manufacturer.

Embodiments of the inventive enclosable photographic booth allow for a complete set of multi perspective high quality vehicle images to be obtained and recorded into a template or placed in a shared network folder in less than 90 seconds, and in some instances in approximately 5, 10, or 15 seconds. Thus, once a subject vehicle is photographed in the inventive enclosable oblong hemispherical domed photographic booth, the vehicle is available and ready for sale online based on the uploaded images and VIN uploaded information. The rapid image processing and recordation of vehicle condition allows for new business models such as creating virtual or cyber dealerships where a wholesale customer never takes possession of a subject vehicle, and the vehicle is dropped shipped to the end retail customer. Photos obtained with the inventive system may be sold along with the subject vehicle for use by a purchasing used car retailer, and as it typically takes four days for the buyer to take delivery of the wholesale vehicle, with instant access to the vehicle photos the purchaser can start advertising the vehicle four days prior to physically taking possession of the vehicle.

Embodiments of the inventive photographic booth may utilize radio frequency identification (RFID) tags to identify and record vehicles as the vehicles are processed through the system. The RFID may be related to the vehicle identification number (VIN) of a vehicle to be processed. It is further appreciated that additional identifiers may be used illustratively including barcodes that relate to the VIN. Information related to the vehicle, such as vehicle make, model, body style, and color encoded in the VIN may be used to automatically adjust lighting. Further information that may be related to the RFID or barcode may include a dealership setting that may also indicate which dealer the vehicle is being shot for, and incorporate that dealer's specific preferences such as lighting style, file size and format, number of photo shots and angles to be recorded. RFID or bar code information, read manually or automatically may also be used to project text onto the background of the shot or overlay text onto the file during processing, such as price, dealer name, vehicle specifications, mileage, etc.

As a person skilled in the art will recognize from the previous detailed description and from the figures and claims, modifications and changes can be made to the preferred embodiments of the invention without departing from the scope of this invention defined in the following claims.

The invention claimed is:

1. A system for determining surface defects of a vehicle, the system comprising:
    a vehicle photographic booth comprising one or more doors, one or more walls, and one or more ceilings, wherein the one or more walls comprise a flat planar interior surface;
    one or more cameras, wherein at least one respective camera of the one or more cameras is mounted in the flat planar interior surface of the one or more walls;
    a plurality of lighting elements associated with the one or more cameras, wherein the plurality of lighting elements are arranged in a substantially semicircular pattern on the flat planar interior surface of the one or more walls; and a computing system configured to cause the one or more cameras to capture data while the plurality of lighting elements illuminate different portions of a surface of the vehicle.

2. The system of claim 1, wherein each lighting element of the plurality of lighting elements casts a light beam at a different angle relative to the surface of the vehicle, thereby illuminating the different portions of the surface of the vehicle.

3. The system of claim 1, wherein the computing system is configured to generate a point cloud for the vehicle.

4. The system of claim 1, wherein the one or more cameras are located at a point where radii of the substantially semicircular pattern meet.

5. The system of claim 1, wherein the data is used to train a machine learning process to identify the surface defects on the surface of the vehicle.

6. The system of claim 1, wherein the data is used to generate a blended image, wherein the blended image allows a user to navigate a light spot around the surface of the vehicle.

7. The system of claim 1, wherein the one or more walls are colored black and the data comprises one or more images of the vehicle with at least one of minimal or no reflections of an interior of the vehicle photographic booth.

8. A method comprising:
moving a vehicle into a vehicle photographic booth comprising one or more doors, one or more walls, and one or more ceilings, wherein the one or more walls comprise a flat planar interior surface;
causing, by a computer system, one or more cameras to capture data, wherein at least one respective camera of the one or more cameras is mounted in the flat planar interior surface of the one or more walls and wherein the one or more cameras provide the data to a computing system; and
causing, by the computer system, a plurality of lights to illuminate different portions of a surface of a vehicle, wherein the plurality of lights are arranged in a substantially semicircular pattern on the flat planar interior surface of the one or more walls.

9. The method of claim 8, wherein the one or more cameras are located at a point where radii of the substantially semicircular pattern meet.

10. The method of claim 8, wherein each light of the plurality of lights casts a light beam at a different angle relative to the surface of the vehicle, thereby illuminating the different portions of the surface of the vehicle.

11. The method of claim 8 further comprising using the data to generate a point cloud for the vehicle.

12. The method of claim 8 further comprising using the data to train a machine learning process to identify surface defects on the surface of the vehicle.

13. The method of claim 8 further comprising generating a blended image using the data, wherein the blended image allows a user to navigate a light spot around the surface of the vehicle.

14. The method of claim 8, wherein the one or more walls are colored black and the data comprises one or more images of the vehicle with at least one of minimal or no reflections of an interior of the vehicle photographic booth.

15. A method comprising:
mounting one or more cameras in a flat planar interior surface of one or more walls of a vehicle photographic booth, wherein the vehicle photographic booth comprises one or more doors, the one or more walls, and one or more ceilings;
positioning a plurality of lights associated with the one or more cameras, wherein the plurality of lights are positioned in a substantially semicircular pattern on the flat planar interior surface of the one or more walls; and
connecting a computer system to the one or more cameras and the plurality of lights, the computer system configured to cause the one or more cameras to capture data while the plurality of lights illuminate different portions of a surface of a vehicle.

16. The method of claim 15, wherein the one or more cameras are located at a point where radii of the substantially semicircular pattern meet.

17. The method of claim 15, wherein each light of the plurality of lights casts a light beam at a different angle relative to the surface of the vehicle, thereby illuminating the different portions of the surface of the vehicle.

18. The method of claim 15, wherein the computer system is further configured to use the data to train a machine learning process to identify surface defects on the surface of the vehicle.

19. The method of claim 15, wherein the computer system is further configured to generate a blended image using the data, wherein the blended image allows a user to navigate a light spot around the surface of the vehicle.

20. The method of claim 15, wherein the one or more walls are colored black and the data comprises one or more images of the vehicle with at least one of minimal or no reflections of an interior of the vehicle photographic booth.

* * * * *